United States Patent [19]
Bennett et al.

[11] 3,761,930
[45] Sept. 25, 1973

[54] APPARATUS FOR AN AIRCRAFT PROXIMITY WARNING SYSTEM

[75] Inventors: David B. Bennett, Minneapolis; Charles P. Harman, Roseville; Robert J. Follen, Minneapolis, all of Minn.

[73] Assignee: Honeywell Inc., Minneapolis, Minn.

[22] Filed: June 23, 1971

[21] Appl. No.: 155,747

[52] U.S. Cl. ..... 343/113 R, 343/112 CA, 343/16 R
[51] Int. Cl. ............................................. G01s 3/50
[58] Field of Search ................. 343/113 R, 112 CA, 343/16 R

[56] References Cited
UNITED STATES PATENTS
3,490,024   1/1970   Sherrill et al. .................. 343/113 R
3,605,096   9/1971   Fothergill et al. ............... 343/113 R Primary Examiner—Benjamin A. Borchelt
Assistant Examiner—Denis H. McCabe
Attorney—Charles J. Ungemach et al.

[57] ABSTRACT

The azimuth quadrant of an intruder aircraft is determined with a triangulation technique which makes use of the arrival times of cooperative signals from the intruder aircraft. The signals from the intruder are received by three antennas and depending on the antenna arrival times, logic signals are generated which set a pair of flip-flops to one of four states (1,1), (0,1), (0,0) or (1,0) indicating that the intruder is in the front, right, rear, or left quadrant, respectively.

2 Claims, 2 Drawing Figures

APPARATUS FOR AN AIRCRAFT PROXIMITY WARNING SYSTEM

BACKGROUND

In some aircraft proximity warning systems the azimuth of the intruder aircraft causing the warning is not provided. This invention is designed for inclusion in a proximity warning system to indicate the azimuth quadrant of the intruder aircraft.

SUMMARY

Azimuth information is obtained by making use of a triangulation technique wherein a signal transmitted by one aircraft (the intruding or responding aircraft) in response to a signal from a second aircraft (the interrogating aircraft) is received at three spaced antennas on the second aircraft. The azimuth of the intruder is a function of the relative arrival times of the signal at the three antennas. The invention provides circuitry for comparing the arrival times of the signal and circuitry for developing logic signals depending upon the result of the comparisons. The logic signals are used to set a four-state device, such as a flip-flop pair, to one of the four states, indicating the azimuth quadrant of the intruder.

DESCRIPTION OF THE PREFERRED EMBODIMENT

Figure 1:
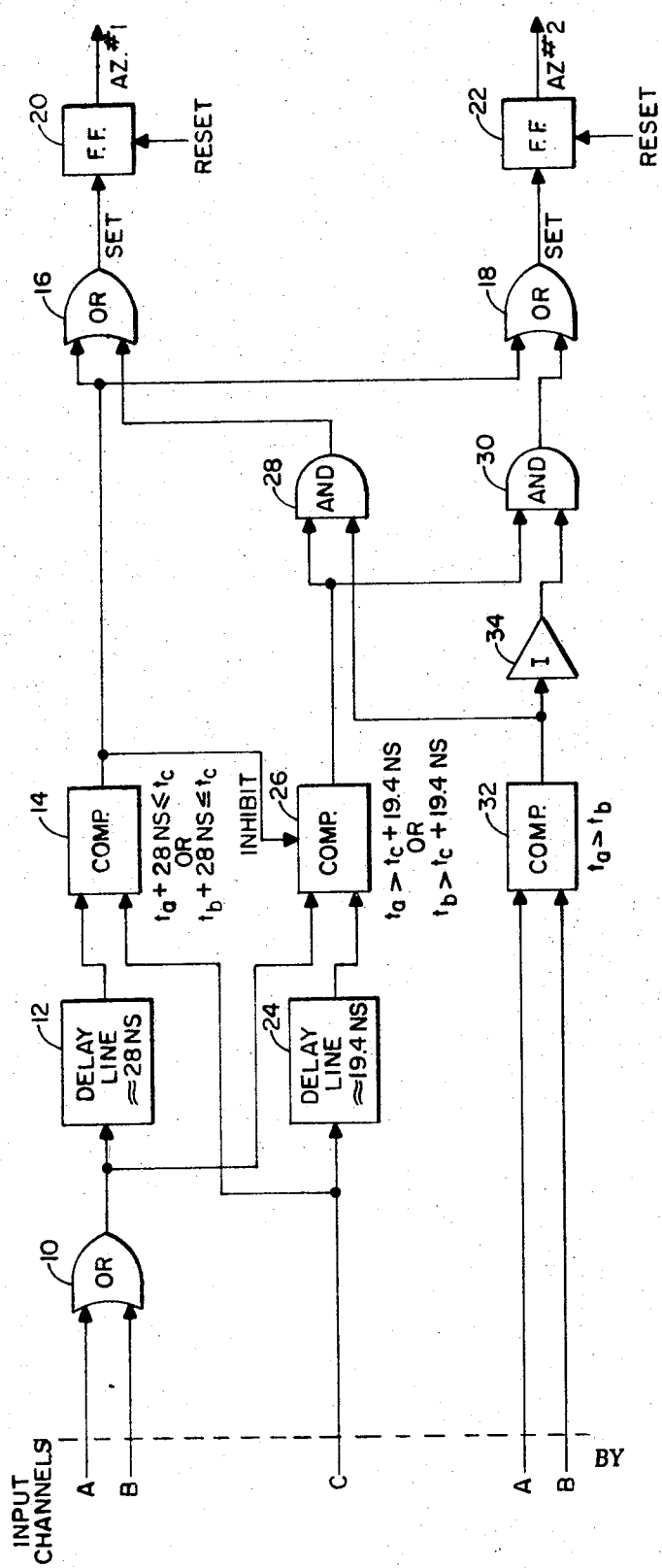
FIG. 1 is a block diagram of a circuit for determining the azimuth quadrant of an intruder aircraft; and, FIG. 2 illustrates a typical antenna installation on a helicopter and identifies the azimuth quadrants and coordinates thereof.
Figure 2:
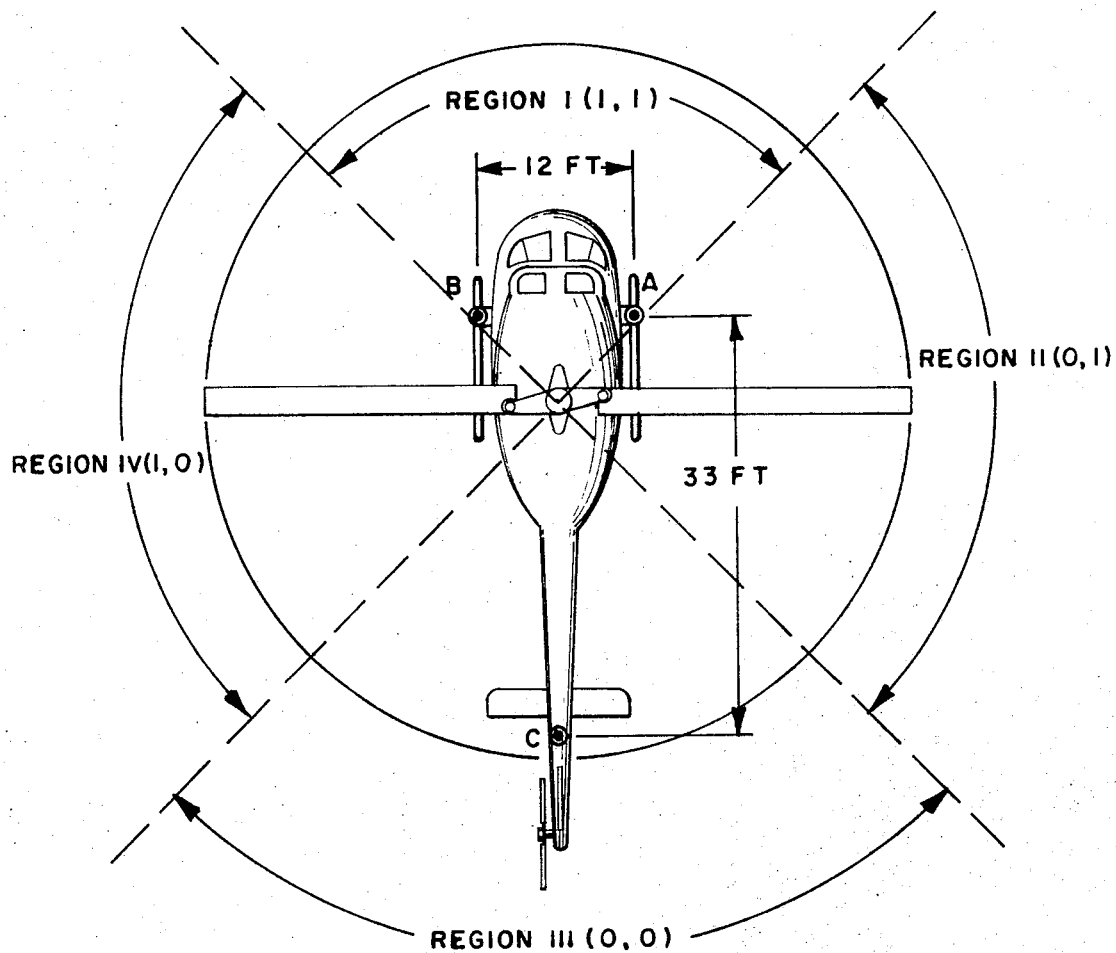

In the system of FIG. 1 the azimuth of an intruder is obtained by making use of the differences in the arrival times of the intruder's response signal at three different antennas. An example of an antenna installation is shown in FIG. 2 where three antennas A, B and C, mounted on a helicopter, provide sufficient information to determine azimuth within one of the four 90° regions I, II, III or IV within a minimum of data processing. Region I is the forward quadrant, region II is the right quadrant, region III is the rear quadrant and region IV is the left quadrant. Each quadrant is characterized by two coordinates (azimuth number 1, azimuth number 2) as follows:

| Region | Coordinates |
|---|---|
| I | (1,1) |
| II | (0,1) |
| III | (0,0) |
| IV | (1,0) |

For example, an intruder in region I would be characterized by coordinates (1,1) and signals respresenting these coordinates are developed by the system of FIG. 1.

Using the dimensions shown in FIG. 2 of 12 feet between the two forward antennas B and A and 33 feet between a line drawn between the forward antennas and the rear antenna C, the azimuth regions can be defined in terms of the intruder response signal arrival times $t_a$, $t_b$ and $t_c$ at antennas A, B and C, respectively. A response signal from an intruder in region I arrives at either antenna A or B at least 28 nanoseconds before it arrives at antenna C. The closest an intruder can be to antenna C and still be in Region I is to be on one of the two boundaries. Assume, for example, that the intruder is on the boundary represented by the dashed line passing through antenna B and that the intruder is out a long way on the boundary, compared to the dimensions between antennas A, B, and C. The difference in the arrival times at antennas B and C is proportional to the difference in the distance between antennas B and C. This is approximately equal to (6 $\sqrt{2}$ + 27 sin 45°) ft = 27.55 ft. This result is obtained by projecting the line from the intruder to antenna C onto the dashed line passing through antenna B. Since electomagnetic energy travels about 984 feet per microsecond, 27.55 feet divided by 984 feet per second equals about 28 NS. A response signal from an intruder in region II arrives at antenna A before it arrives at antenna B and arrives at antenna A less than 28 nanoseconds before it arrives at antenna C or arrives at antenna C equal to or less than 19.4 nanoseconds before it arrives at antenna A. The 19.4 NS difference in arrival time is reached by assuming an intruder is on the right boundary of Region III and out a long way compared to the dimensions between the antenna array. This is the closest an intruder can be to antenna A and still be in Region III. The difference in arrival time is proportional to the difference in distance which is approximately 27 sin 45° ft which is the length of the line from the center of the helicopter to antenna C projected onto the dashed line running through antenna B. This is about 19.09 feet which when divided by 984 feet per second results in a difference in arrival time of 19.4 NS. A response signal from an intruder in region III arrives at antenna C at least 19.4 nanoseconds before it arrives at antenna A or B. The relationship in region IV is analogous to that in region II. A response signal from an intruder in region IV arrives at antenna B before it arrives at antenna A and arrives at antenna B less than 28 nanoseconds before it arrives at antenna C or arrives at antenna C equal to or less than 19.4 nanoseconds before it arrives at antenna B.

The time relationships in the various regions are expressed more formerly as follows:

Region I : $t_c - t_a \geq$ 28NS or $t_c - t_b \geq$ 28NS
Region II : $t_b > t_a$ and 19.4NS $\geq t_a - t_c >$ −28NS
Region III: $t_a - t_c >$ 19.4NS or $t_b - t_c >$ 19.4NS
Region IV : $t_b < t_a$ and 19.4NS $\geq t_b - t_c >$ −28NS Referring to FIG. 1, an intruder in region I is determined in the following way. The signals from antenna A and B are applied to an OR gate 10, the output of which is applied to a delay line 12 having a delay of approximately 28 nanoseconds. The delayed signal from line 12 and the signal from antenna C are applied to a comparator 14 which develops a positive output signal (which will be called a logical 1 or "1") if the delayed signal is received first and a negative signal (which will be called a logical 0 or "0") if the delayed signal is received last. The output signals from comparator 14 are applied to a pair of OR gates 16 and 18 which when activated set flip-flops 20 and 22, respectively. The logical states of flip-flops 20 and 22 correspond to the coordinate azimuth number 1 and azimuth number 2, respectively. Therefore, when a response signal is received from an intruder in region 1 comparator 14 develops a logical 1 output signal, both OR gates 16 and 18 are activated, and both flip-flops 20 and 22 are set to the logical 1 state. With both flip-flops 20 and 22 set to a logical 1 state the coordinates are (1,1) and the azimuth of the intruder is indicated as region 1. Flip-flops 20 and 22 are periodically reset.

An intruder in region II is determined in the following way. The signal from antenna C is applied to a delay line 24 having a delay of approximately 19.4 nanoseconds. The delayed signal and the output signal of OR gate 10 are applied to a comparator 26 which develops a positive output signal ("1") if the delayed signal is received last and a negative output signal ("0") if the delayed signal is received first. The output signal developed by comparator 14 is also applied to comparator 26 such that comparator 26 is inhibited if the output of comparator 14 is in a "1" state. (Some signals from intruders in region I which normally cause comparator 14 to respond would also cause comparator 26 to respond if it was not inhibited.) The signals from antennas A and B are also applied to a comparator 32 which develops a negative output signal ("0") if the signal from antenna A arrives before that from antenna B and develops a positive output signal ("1") if the signal from antenna B arrives before that from antenna A. The output of comparator 26 is applied to a pair of AND gates 28 and 30 and the output of comparator 32 is also applied to AND gate 28 and to an inverter 34. The output of inverter 34 is applied to AND gate 30. The outputs of AND gates 28 and 30 are applied to OR gates 16 and 18 respectively.

When a response from an intruder in region II is received the following situation exists. The output of comparator 26 is "1", the output of comparator 32 is "0", the output of inverter 34 is "1" and AND circuit 30 is activated. The activation of AND gate 30 causes OR gate 18 to be activated and flip-flop 22 is set to the "1" state. Although AND gate 30 is activated AND gate 28 is not activated, therefore the output of AND gate 28 is "0" as is the output of comparator 14 and OR gate 16 is not activated. Therefore flip-flop 20 remains in the "0" state and the coordinates (0,1) for region II are indicated.

When a response signal is received from an intruder in region IV the following situation exists. The output of comparator 26 is "1" just at it was for a region II situation but whereas the output of comparator 32 was "0" for a region II situation it becomes "1" for a region IV situation. Therefore AND gate 28, rather than AND gate 30, is activated which in turn activates OR gate 16 and flip-flop 20 is set to the "1." Since the output of comparator 14 in a region IV situation is "0" and since AND gate 30 is deactivated OR gate 18 is also deactivated and flip-flop 22 remains in the "0" state. Therefore flip-flops 20 and 22 indicate the coordinates (1,0), corresponding to an intruder in region IV.

When a response from an intruder in region III is received the following situation exists, the out-puts of both comparator 14 and comparator 26 are in the "0" state. Therefore AND gate 28, AND gate 30, and OR gate 16 are not activated and flip-flops 20 and 22 remain in the "0" state, indicating the coordinates (0,0) for an intruder in region III. Therefore region III aircraft are identified as aircraft which are not in regions I, II, or IV.

A specific embodiment has been described, but the invention is not limited thereto. Other embodiments may occur to those skilled in the art and the invention is to be limited only by what is claimed.

We claim:

1. In a proximity warning system for an aircraft, apparatus for determining the azimuth of signals from an intruder aircraft comprising:

means including three antennas A, B and C, for receiving the signals from the intruder aircraft, antennas A and B mounted in a first quadrant of the aircraft and antenna C in a second quadrant;

means for delaying the signals received by antennas A and B;

first comparator means responsive to the delayed signals from antennas A and B and the undelayed signals received by antenna C for comparing the timing of the delayed signals with that of the undelayed signals and developing an output signal if the delayed signals occur first;

means for delaying signals received by antenna C;

second comparator means responsive to delayed signals received by antenna C and undelayed signals received by antennas A and B, for comparing the timing of the delayed signals with that of the undelayed signals and developing an output signal if the undelayed signals occur first, the second comparator means being inhibited, however, if the first comparator means has developed an output signal;

third comparator means responsive to undelayed signals received by antennas A and B and developing an output signal if the signal received by antenna A occurs first;

means responsive to the output signal of said third means for inverting said output signal;

a first AND circuit responsive to the output signals of the second and third comparator means and developing an output signal;

a second AND circuit responsive to the output signal of the second comparator means and the inverted output signal of the third comparator means and developing an output signal;

a first OR circuit responsive to the output signals of the first comparator means and the first AND circuit and developing an output signal;

a second OR circuit responsive to the output signals of the first comparator means and the second AND circuit and developing an output signal;

a first flip-flop circuit, developing an output signal in response to the output signal of the first OR circuit; and, a second flip-flop circuit, developing an output signal in response to the output signal of the second OR circuit, the combined states of the first and second flip-flops denoting the quadrant of the intruder aircraft.

2. The apparatus of claim 1 wherein the first and second quadrants of the aircraft are the forward and rear quadrants, respectively.

* * * * *